(12) United States Patent
Watanabe et al.

(10) Patent No.: US 8,611,903 B2
(45) Date of Patent: Dec. 17, 2013

(54) RADIO COMMUNICATION METHOD, SYSTEM FOR SHORTENING HANDOVER PROCESS TIME VIA A RADIO COMMUNICATION CONTROL PART, A PSEUDO RADIO COMMUNICATION CONTROL PART, AND HANDOVER CONTROL PART IN A MOBILE COMMUNICATION TERMINAL

(75) Inventors: Yoshikazu Watanabe, Tokyo (JP); Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/396,524

(22) Filed: Feb. 14, 2012

(65) Prior Publication Data

US 2012/0140741 A1    Jun. 7, 2012

Related U.S. Application Data

(63) Continuation of application No. 11/135,670, filed on May 24, 2005.

(30) Foreign Application Priority Data

May 31, 2004    (JP) ................................. 2004-160483

(51) Int. Cl.
*H04W 36/00* (2009.01)

(52) U.S. Cl.
USPC ........ 455/436; 455/420; 455/422.1; 455/437; 455/439; 455/440; 370/328; 370/331; 370/332; 370/338

(58) Field of Classification Search
USPC ........... 455/432.1–453, 522–525, 550.1, 561, 455/420, 421, 422.1, 436, 437, 438, 439, 455/440, 441, 41.1, 41.2, 556.2, 404.1, 455/456.1, 456.2, 456.5, 456.6; 370/335, 370/328, 329, 338, 310.2, 331–332
See application file for complete search history.

(56) References Cited

U.S. PATENT DOCUMENTS 5,970,408 A    10/1999  Carlsson et al.
6,408,180 B1    6/2002  McKenna et al.
(Continued)

FOREIGN PATENT DOCUMENTS

DE    102 08 689    2/2002
JP    11-018133    1/1999
(Continued)

OTHER PUBLICATIONS

USPTO Office Action, U.S. Appl. No. 13/396,524, Mar. 14, 2012, 11 pages.

*Primary Examiner* — Vladimir Magloire
*Assistant Examiner* — Babar Sarwar
(74) *Attorney, Agent, or Firm* — Foley & Lardner LLP

(57) ABSTRACT

The present invention provides a radio communication system that enables handovers between radio base stations to be conducted at a short time using a mobile communication terminal having one radio communication part. A pseudo radio communication control part in a mobile communication terminal links with a packet transfer part and a remote radio control part in a radio bridge device to enable operation as though a radio communication part disposed in the radio bridge device were directly connected to the mobile communication terminal. Thus, even when radio communication parts are disposed in a plurality of terminals, by using the pseudo radio communication control part instead of a radio communication control part, an application can carry out control as though all the radio communication parts were connected in the same terminal.

15 Claims, 13 Drawing Sheets

(56) References Cited

U.S. PATENT DOCUMENTS

| | | | |
|---|---|---|---|
| 6,526,034 B1 | 2/2003 | Gorsuch | |
| 6,917,808 B1 * | 7/2005 | Nelson | 455/436 |
| 2002/0137538 A1 | 9/2002 | Chen et al. | |
| 2003/0235165 A1 * | 12/2003 | Wang | 370/331 |
| 2004/0002335 A1 | 1/2004 | Pan et al. | |

FOREIGN PATENT DOCUMENTS

| | | |
|---|---|---|
| JP | 11-027720 | 1/1999 |
| JP | 2002-112308 | 4/2002 |
| JP | 2004-056697 | 2/2004 |
| WO | WO 99/48315 | 9/1999 |

* cited by examiner

RADIO COMMUNICATION METHOD, SYSTEM FOR SHORTENING HANDOVER PROCESS TIME VIA A RADIO COMMUNICATION CONTROL PART, A PSEUDO RADIO COMMUNICATION CONTROL PART, AND HANDOVER CONTROL PART IN A MOBILE COMMUNICATION TERMINAL

CROSS-REFERENCE TO RELATED PATENT APPLICATIONS

This application is a Continuation of U.S. application Ser. No. 11/135,670, filed May 24, 2005, which claims priority to Japan Application No. 2004-160483, filed May 31, 2004, both of which are incorporated herein by reference in their entirety.

BACKGROUND OF THE INVENTION

1. Field of the Invention

The present invention relates to a radio communication system and a communication method thereof, and more particularly to a radio communication system that conducts handovers between radio base stations at a short time and a communication method thereof.

2. Description of the Prior Art

In a mobile communication terminal that conducts radio communication while moving by means of a wireless LAN (Local Area Network) or the like, an apparatus that has a plurality of radio communication parts is known. Each radio communication part carries out the process to connect itself to the different base station to reduce the period of time in which communication cannot carried out. The period of time is generated when a mobile communication terminal moves from a base station to another base station (handover).

FIG. 12 is a schematic diagram of one example of a conventional communication system, and FIG. 13 is a schematic diagram of one example of a mobile communication terminal in the conventional communication system.

Referring to FIG. 12, the example of a conventional communication system comprises a fixed network 101, base stations 102 and 103 that are connected by wire with the fixed network 101, and a mobile communication terminal 104 which is capable of a wireless connection with the base stations 102 and 103.

Further, the mobile communication terminal 104 comprises an information processing part 111 and radio communication parts 112 and 113.

The information processing part 111 controls a connection with the base station 102 through the radio communication part 112, and controls a connection with the base station 103 through the radio communication part 113.

Referring to FIG. 13, the information processing part 111 in the mobile communication terminal 104 comprises radio communication control parts 121 and 122 and a handover control part 123.

The handover control part 123 controls the radio communication part 112 through the radio communication control part 121, and controls the radio communication part 113 through the radio communication control part 122.

The radio communication control parts 121 and 122 are software that control the radio communication parts 112 and 113, and they provide an interface for other applications in the system to carry out status setting or status acquisition of the radio communication parts 112 and 113 or to carry out transmission and reception of data using the radio communication parts 112 and 113.

The handover control part 123 is software for conducting a fast handover between the base stations 102 and 103, and it provides a virtual communication interface for other applications in the system. The handover control part 123 continuously monitors and controls the status of the two radio communication parts 112 and 113 using the radio communication control parts 121 and 122, and selects the radio communication part with the best communication quality from the radio communication parts 112 and 113, for communication with the base station 102 or 103.

When the handover control part 123 receives a request for transmission or reception of data from an application, it processes the request using the radio communication part that was selected for communication.

The handover control part 123 controls the radio communication part other than the radio communication part that was selected for communication to search the neighboring base stations and to connect to a base station that is a candidate as a handover destination in advance.

For example, when the radio communication part 112 that is connected to the base station 102 is selected for communication, the handover control part 123 controls the radio communication part 113 to search for a base station, and then connects the radio communication part 113 to the base station 103 that was found as a result of the search.

When the connection status of the radio communication part 113 becomes more favorable than that of the radio communication part 112, the handover control part 123 switches to the radio communication part 113 as the radio communication part used for communication, and controls the radio communication part 112 to search for a base station and so forth, thereby conducts a handover from the base station 102 to the base station 103.

Thus, by providing the mobile communication terminal 104 with a plurality of radio communication parts and carrying out appropriate control, the time required for a handover can be reduced to an extremely short time.

On the contrary, when only one radio communication part is provided, communication is not possible while searching for a base station or during processing to connect to a base station, and therefore a time in which communication is not possible arises at the time of a handover.

As another example of this type of prior art, technology has been disclosed in which, when a radio mobile terminal is selecting a base station for communication, it receives the respective control signals of neighboring base stations and determines the base station with the largest electric field intensity among base stations found within a predetermined time or determines a base station with an electric field intensity that exceeds a predetermined favorable electric field intensity. Once a base station for which the electric field intensity exceeds a predetermined favorable intensity is found, the search is immediately terminated, even if the predetermined time has not elapsed, and that base station is selected as the base station for communication (see Patent Document 1).

As a further example of this type of prior art, technology has been disclosed in which a mobile station 16 negotiates with a base station 14 in a cell 13 using a radio set 18 before the reception level of a radio set 17 decreases, to thereby acquire a channel of the base station 14 in advance. Then, when the reception level of the radio set 17 has decreased, a switch 19 is used to perform switching from a channel of a base station 12 to the channel of the base station 14 (see Patent Document 2).

[Patent Document 1] Japanese Patent Laid-Open No. 11-18133 (paragraphs 0008, 0018-0021 and FIG. 4)
[Patent Document 2] Japanese Patent Laid-Open No. 11-27720 (paragraph 0020 and FIG. 2)

Although it is necessary to mount a plurality of radio communication parts such as wireless LAN cards on a computer board for a mobile communication terminal having the above kind of functions, since the kinds of computer boards having an interface that enables these functions are few, problems exist in that there are few boards that satisfy required specifications and that downsizing is difficult.

Further, even when it is possible to mount a plurality of radio communication parts on a computer board, the radio communication parts are disposed extremely close to each other resulting in the problem that communication quality deteriorates due to the effects of mutual interference of the radio waves.

In the aforementioned Patent Documents 1 and 2, nothing is disclosed regarding the characteristic configuration of the present invention in which each radio communication part is disposed in a different terminal.

BRIEF SUMMARY OF THE INVENTION

Thus, an object of the present invention is to provide a radio communication system that enables a handover between radio base stations to be conducted at a short time using a mobile communication terminal having one radio communication part, and a communication method thereof.

In order to solve the problems described above, according to this invention there is provided a radio communication system that conducts a handover between radio base stations at a short time, wherein a mobile communication terminal includes a first radio communication part that communicates with a first base station, a radio bridge device includes a second radio communication part that communicates with a second base station, and the mobile communication terminal includes a first information processing means that carries out processing of information of the first radio communication part and the second radio communication part.

Further, according to this invention there is provided a communication method for a radio communication system that conducts a handover between radio base stations at a short time, the system comprising a mobile communication terminal including a first radio communication part that communicates with a first base station, and a radio bridge device including a second radio communication part that communicates with a second base station, wherein the communication method includes a first information processing step that carries out processing of information of the first radio communication part and the second radio communication part in the mobile communication terminal.

According to the present invention, by providing the configuration described above, a handover using a plurality of radio communication parts is enabled using a mobile communication terminal having one radio communication part.

More specifically, since the present invention does not dispose a plurality of radio communication parts on a computer board in one terminal and instead disposes each radio communication part in a different device, there are fewer restrictions in selecting a computer board used for mounting the devices, and thus it is easy to obtain the board satisfying requirements specifications and downsizing of a device is also facilitated.

Since a plurality of radio communication parts can be disposed at separate locations, it is possible to avoid effects on communication quality due to interference of radio waves among the radio communication parts. In addition, each radio communication part can be disposed at a suitable position within a mobile unit in accordance with the location of a radio base station or the shape of the mobile unit, to thereby facilitate the making of a connection between the radio communication part and the radio base station.

Further, since a pseudo radio communication control part that controls a radio communication part in another terminal provides the exact same interface to an application as a radio communication control part controlling a radio communication part in the mobile communication terminal itself, conventional handover control software can be utilized without modification even when the radio communication parts are disposed separately among a plurality of terminals.

DETAILED DESCRIPTION OF THE PREFERRED EMBODIMENTS

Figure 1:
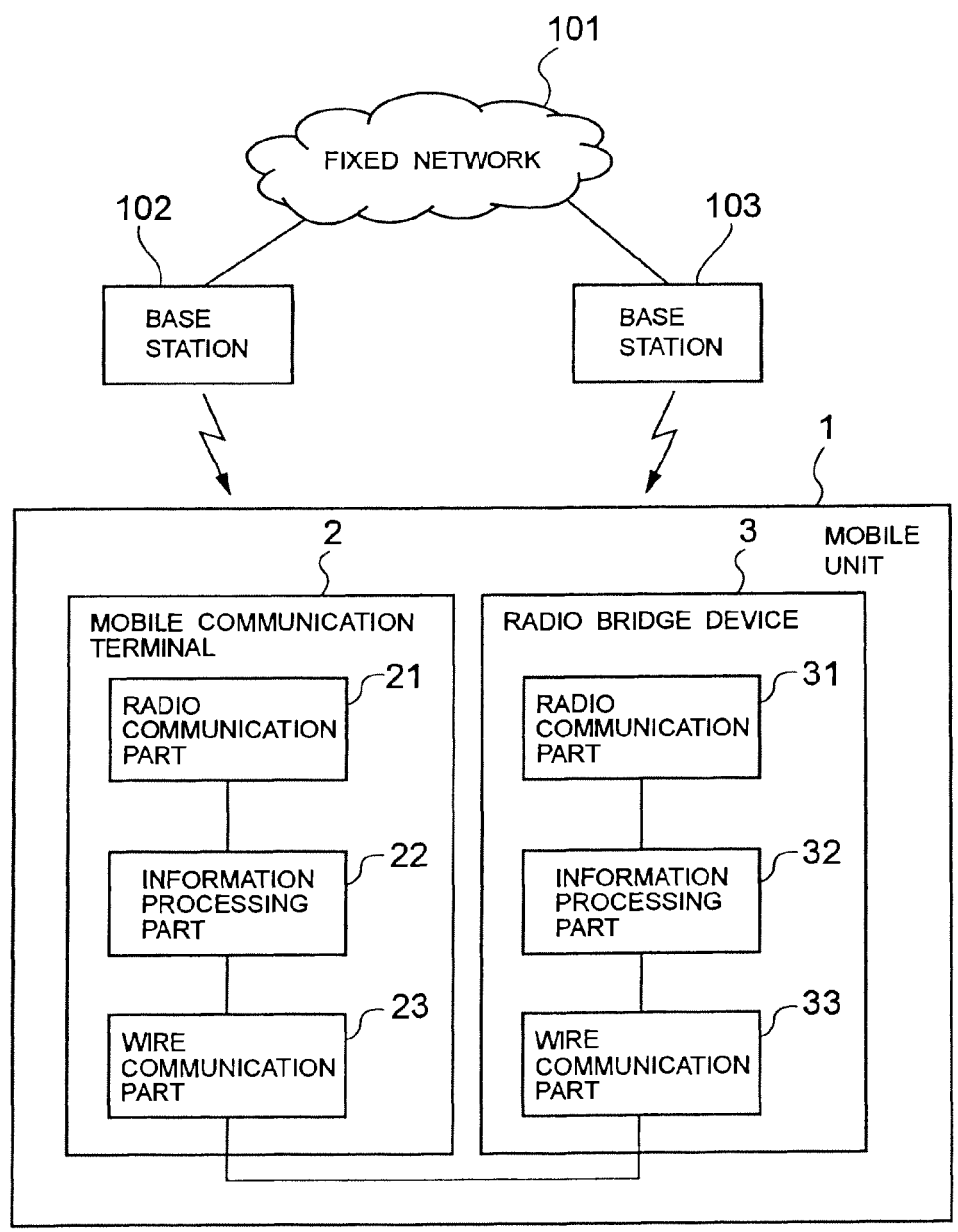
FIG. 1 is a schematic diagram of a first embodiment of the radio communication system of the present invention.

The preferred embodiments of the present invention will be described below with referring to the drawings.

Embodiment 1

Figure 12:
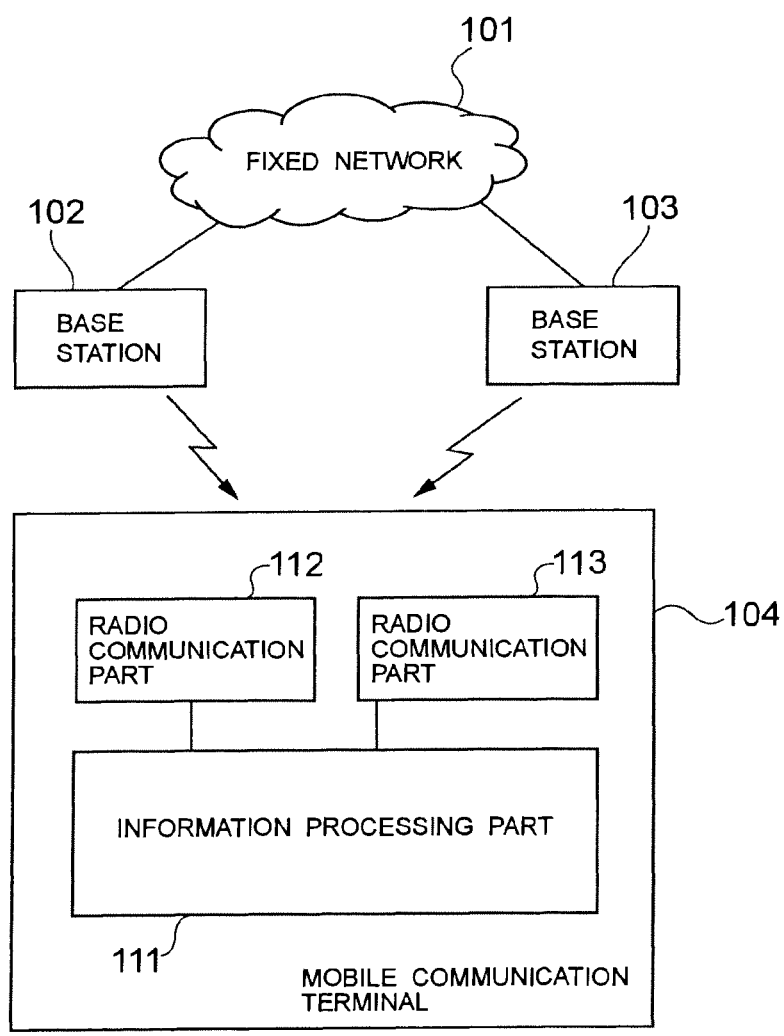
FIG. 12 is a schematic diagram of one example of a conventional communication system.
Figure 13:
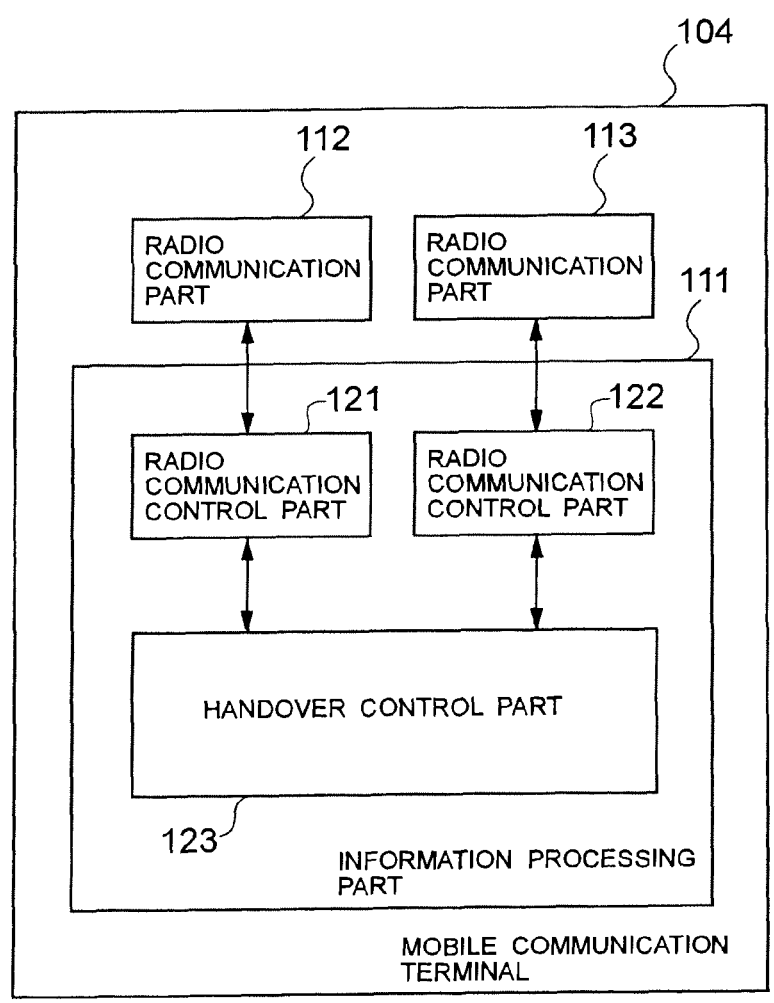
FIG. 13 is a schematic diagram of one example of a mobile communication terminal in a conventional communication system.

FIG. 1 is a schematic diagram of a first embodiment of the radio communication system of this invention. In FIG. 1, components that are the same as those in FIG. 12 are denoted by the same number as in FIG. 12, and a description of those components is omitted below.

Referring to FIG. 1, the radio communication system of the present invention comprises a fixed network 101, base stations 102 and 103 that are connected by wire with the fixed network 101, and a mobile unit 1 which is connected by a wireless connection with the base stations 102 and 103.

The mobile unit 1 comprises a mobile communication terminal 2 and a radio bridge device 3.

The mobile communication terminal 2 comprises a radio communication part 21, an information processing part 22 and a wire communication part 23. The radio bridge device 3 comprises a radio communication part 31, an information processing part 32 and a wire communication part 33.

The radio communication part 21 in the mobile communication terminal 2 is capable of making a wireless connection with the base station 102, and the radio communication part 31 in the radio bridge device 3 is capable of making a wireless connection with the base station 103. Further, the mobile communication terminal 2 and the radio bridge device 3 can communicate with each other through their wire communication parts 23 and 33, respectively.

Figure 2:
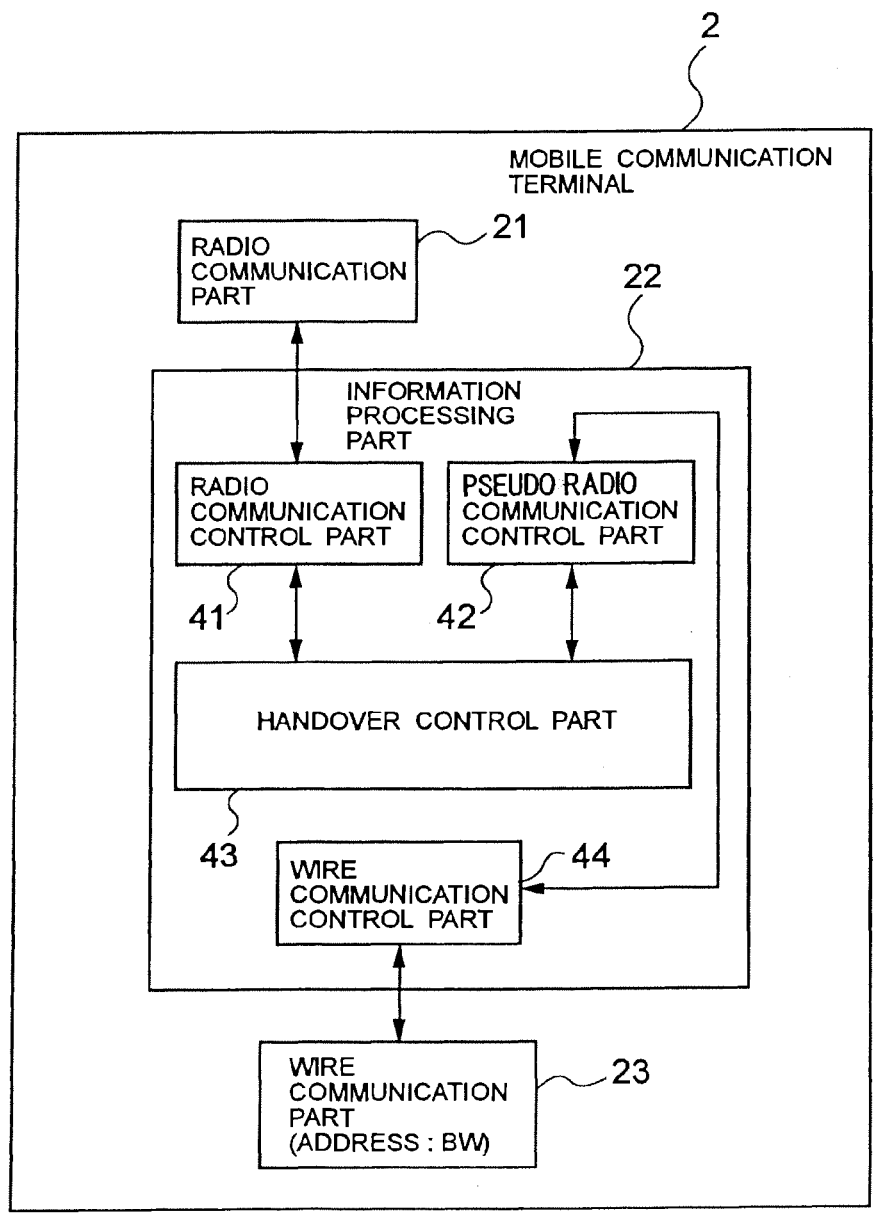
FIG. 2 is a schematic diagram of one example of a mobile communication terminal 2.

Next, the configuration of the mobile communication terminal 2 will be described. FIG. 2 is a schematic diagram of one example of the mobile communication terminal 2. In FIG. 2, components that are the same as those in FIG. 1 are denoted by the same number as in FIG. 1, and a description of these components is omitted below.

The information processing part 22 in the mobile communication terminal 2 comprises a radio communication control part 41, a pseudo radio communication control part 42, a handover control part 43 and a wire communication control part 44.

The radio communication control part 41 is software that conducts control of the radio communication part 21, and it provides an interface for other applications in the system to carry out status setting or status acquisition of the radio communication part 21 or to carry out transmission and reception of data using the radio communication part 21.

Likewise, the wire communication control part 44 provides an interface to perform status setting or status acquisition of the wire communication part 23 or transmission and reception of data using the wire communication part 23.

Similarly to the radio communication control part 41, the pseudo radio communication control part 42 provides an interface for other applications in the system to carry out status setting or status acquisition of a radio communication part or to carry out transmission and reception of data using a radio communication part. This interface is exactly the same as the interface provided by the normal radio communication control part 41.

However, unlike the radio communication control part 41, the pseudo radio communication control part 42 does not actually have a radio communication part as an object of control in the mobile communication terminal 2. The object of control of the pseudo radio communication control part 42 is the radio communication part 31 in the radio bridge device 3.

The handover control part 43 uses the radio communication control part 41 when sending and receiving data from the radio communication part 21 in the mobile communication terminal 2, and uses the pseudo radio communication control part 42 when sending and receiving data from the radio communication part 31 inside the radio bridge device 3.

Since the handover control part 43 cannot directly use the radio communication part 31 in the radio bridge device 3, the pseudo radio communication control part 42, the wire communication part 23 and a packet transfer part 52 that is described later are provided as means to connect the handover control part 43 with the radio communication part 31.

When the handover control part 43 uses the radio communication part 21 in the mobile communication terminal 2, it can carry out sending and receiving of data directly using the conventional radio communication control part 41. Therefore, there is no device in the handover control part 43 that corresponds with the packet transfer part 52, which is described later, in the radio bridge device 3. The foregoing also applies with respect to a remote radio control part 53 that is described later.

Figure 3:
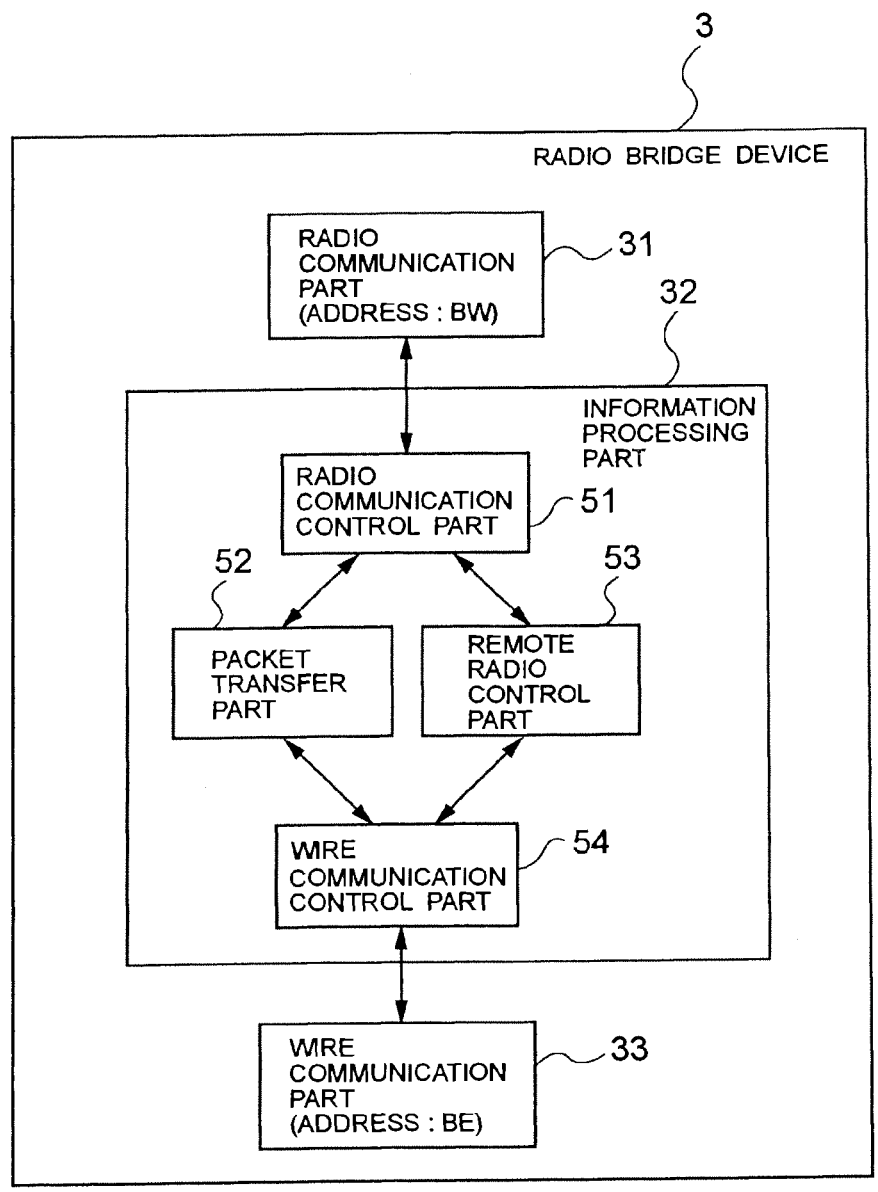
FIG. 3 is a schematic diagram of one example of a radio bridge device 3.

Next, the configuration of the radio bridge device 3 is described. FIG. 3 is a schematic diagram of one example of the radio bridge device 3. In FIG. 3, components that are the same as those in FIG. 1 are denoted by the same number as in FIG. 1, and a description of these components is omitted below.

The information processing part 32 in the radio bridge device 3 comprises a radio communication control part 51, a packet transfer part 52, a remote radio control part 53 and a wire communication control part 54.

The pseudo radio communication control part 42 in the mobile communication terminal 2 links with the packet transfer part 52 and the remote radio control part 53 in the radio bridge device 3 to enable operation as though the radio communication part 31 disposed in the radio bridge device 3 were directly connected to the mobile communication terminal 2. Thus, even when the radio communication parts are disposed separately among a plurality of terminals, by using the pseudo radio communication control part 42 in place of the radio communication control part, an application can carry out control as though all of the radio communication parts were connected in the same terminal.

Hereinafter, an L2 address that is used by the radio communication part 31 of the radio bridge device 3 is denoted by "BW", and an L2 address that is used by the wire communication part 33 of the radio bridge device 3 is denoted by "BE".

BW is set for the L2 address of the interface of the wire communication part 23 interface of the mobile communication terminal 2, and not an address initialized by the device. The source address of data sent from this interface is set as BW.

By setting the same address for the L2 address of the wire communication part 23 in the mobile communication terminal 2 and the L2 address of the radio communication part 31 in the radio bridge device 3, it is not necessary for the base stations 102 and 103 or the fixed network 101 to be aware of the difference between the radio bridge device 3 and a wire communication terminal (wire communication part 23).

When the L2 addresses of the radio bridge device 3 and the wire communication terminal (wire communication part 23) are different, a higher layer protocol, for example, in the case of IP (Internet Protocol) the ARP (protocol that conducts conversion between an IP address and an L2 address) will not operate as it is and it is necessary to carry out some form of modification.

However, when the L2 address of the radio bridge device 3 is the same as that of the wire communication terminal (wire communication part 23), the radio bridge device 3 and the wire communication terminal (wire communication part 23) are the same when viewed from a higher layer protocol and it is thus possible to use the existing protocol without carrying out any kind of modification.

In this connection, "L2" in the term "L2 address" is used as an abbreviation for the data link layer (Layer 2) in the OSI (Open Systems Interconnection) 7-layer model. The L2 address is located below the network layer (Layer 3), and is used as the address when conducting communication within the same network.

The wire communication part 33 of the radio bridge device 3 receives not only data for which the destination L2 address is BE, but also all data sent and received on the connected wire network.

Next, one example of the operation of the radio communication system of the present invention will be described below with referring to the attached drawings. First, the operation of the handover control part 43 in the mobile communication terminal 2 shown in FIG. 2 is described.

Referring to FIG. 2, the handover control part 43 controls the radio communication part 21 through the radio communication control part 41, and controls the radio communication part 31 in the radio bridge device 3 through the pseudo radio communication control part 42.

The radio communication control part 41 and the pseudo radio communication control part 42 are software that carry out control of the radio communication parts 21 and 31, and they provide an interface for other applications in the system to carry out status setting or status acquisition of the radio communication parts 21 and 31 or to carry out transmission and reception of data using the radio communication parts 21 and 31.

The handover control part 43 is software for conducting a handover between the base stations 102 and 103 at a short time, and it provides a virtual communication interface for other applications in the system.

The handover control part 43 continuously monitors and controls the status of the two radio communication parts 21 and 31 using the radio communication control part 41 and the pseudo radio communication control part 42, and selects the radio communication part with the best communication quality from the radio communication parts 21 and 31 for communication with the base station 102 or 103.

When the handover control part 43 receives a request for transmission or reception of data from an application, it processes the request using the radio communication part selected for communication.

The handover control part 43 controls the radio communication part other than the radio communication part selected for communication to search the neighboring base stations and to connect to a base station that is a candidate as a handover destination in advance.

For example, when the radio communication part 21 that is connected to the base station 102 is selected for communication, the handover control part 43 controls the radio communication part 31 through the pseudo radio communication control part 42 to search for a base station and then to connect to the base station 103 that was found as a result of the search.

When the connection status of the radio communication part 31 becomes more favorable than that of the radio communication part 21, the handover control part 43 switches to the radio communication part 31 as the radio communication part used for communication, and controls the radio communication part 21 to search for a base station and so forth, thereby conducting a handover from the base station 102 to the base station 103.

Next, operations for sending and receiving packets will be described. FIGS. 4 to 7 are flowcharts showing examples of operations to send and receive packets. The packet transfer part 52 in the radio bridge device 3 receives the packets that arrived at the radio communication part 31 and the wire communication part 33, through the radio communication control part 51 and the wire communication control part 54.

Figure 4:
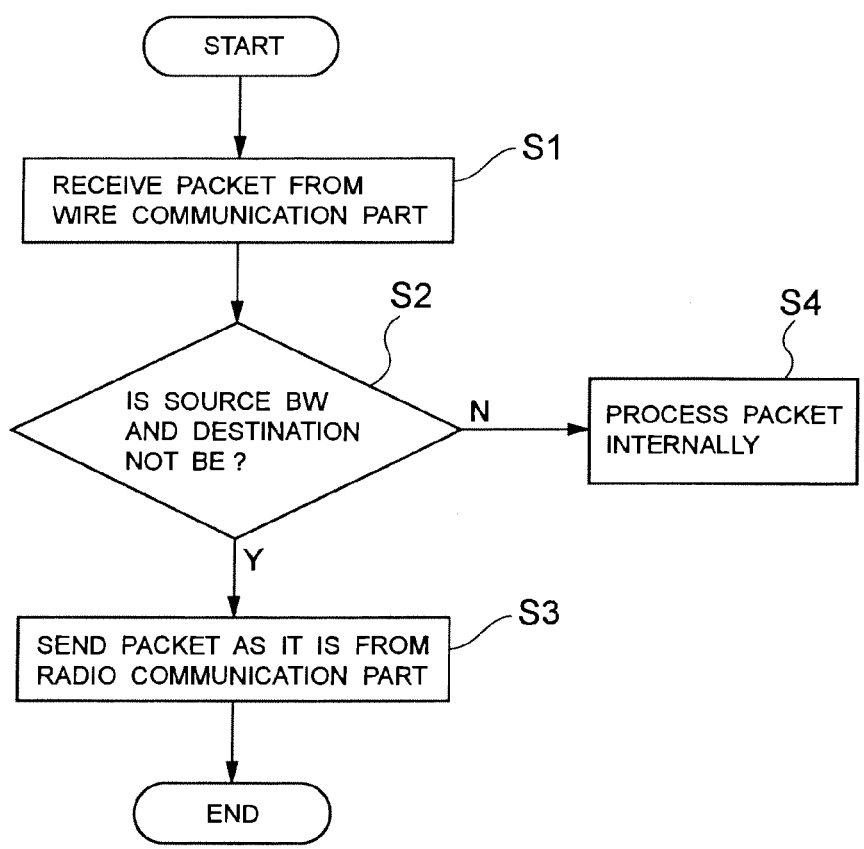
FIG. 4 is a flowchart showing an example of an operation to send and receive packets.

Referring to FIG. 4, when packets are received from the wire communication part 33 (step S1), if the source L2 address of the received data is BW and the destination L2 address is not BE (Y in step S2), the packet transfer part 52 sends that data as it is, without changing the source and the destination L2 address, from the radio communication part 31 through the radio communication control part 51 (step S3).

The data of which source L2 address is BW and destination L2 address is not BE is the data which the handover control part 43 sent to the wire communication part 33 in the radio bridge device 3. The handover control part 43 sent it to the wire communication part 33 so as to transmit it from the radio communication part 31 in the radio bridge device 3. It means that the radio communication part 31 in the radio bridge device 3 is connected to the base station 103 by the handover control part 43 and it is selected for communication.

On the contrary, when the source L2 address of received data is not BW or the destination L2 address is BE (N in step S2), the packet transfer part 52 processes the packets internally (step S4).

Figure 5:
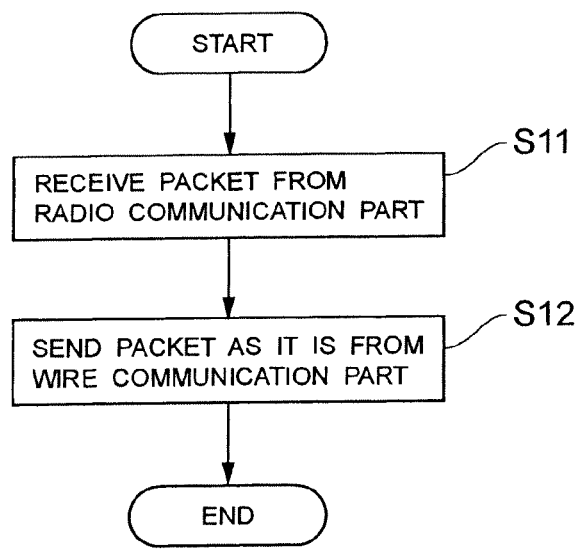
FIG. 5 is a flowchart showing an example of an operation to send and receive packets.

Next, referring to FIG. 5, when the packet transfer part 52 receives the packet from the radio communication part 31 (step S11), it sends the received data as it is from the wire communication part 33 through the wire communication control part 54 (step S12).

The fact that packets were received from the radio communication part 31 indicates that the radio communication part 31 in the radio bridge device 3 is connected to the base station 103 and selected for communication by the handover control part 43.

Figure 6:
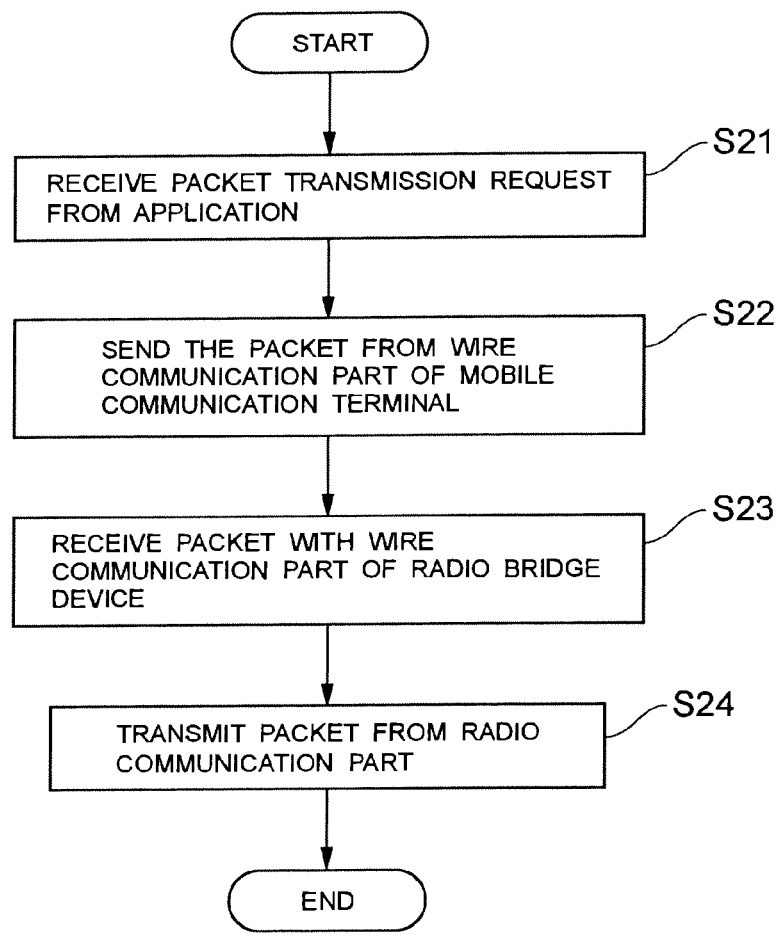
FIG. 6 is a flowchart showing an example of an operation to send and receive packets.

Referring to FIG. 6, when a request to send packets is received from an application (step S21), the pseudo radio communication control part 42 sends the packets from the wire communication part 23 (step S22). At this time, the destination L2 address of the packets is the address specified by the application and the source L2 address is BW. The packets are received by the wire communication part 33 in the radio bridge device 3 (step S23), and then sent from the radio communication part 31 by the packet transfer part 52 (step S24).

Figure 7:
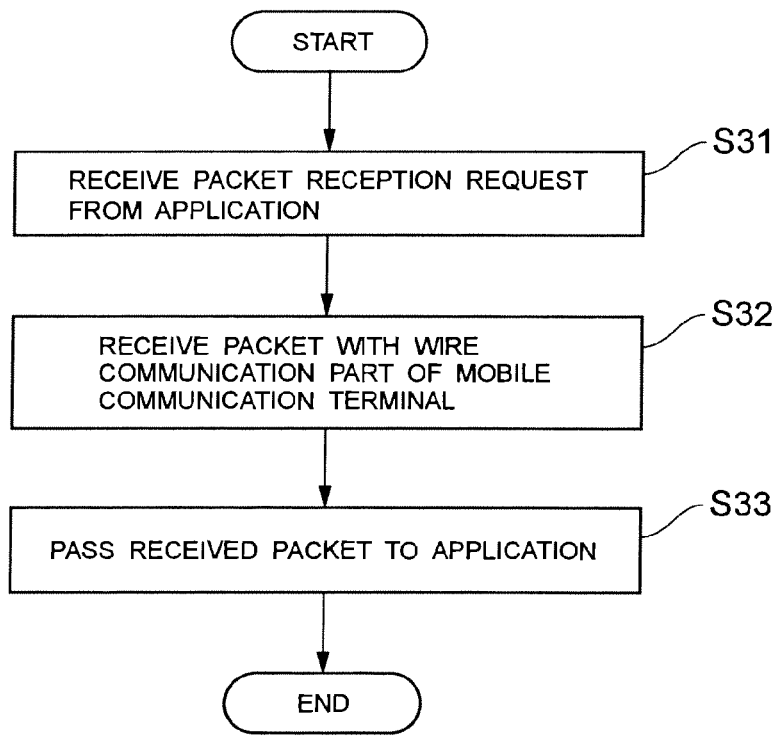
FIG. 7 is a flowchart showing an example of an operation to send and receive packets.

Referring to FIG. 7, when a request to receive packets is received from an application (step S31), the pseudo radio communication control part 42 carries out reception of the packets from the wire communication part 23 using the wire communication control part 44 (step S32), and passes the received packets to the application (step S33).

Figure 8:
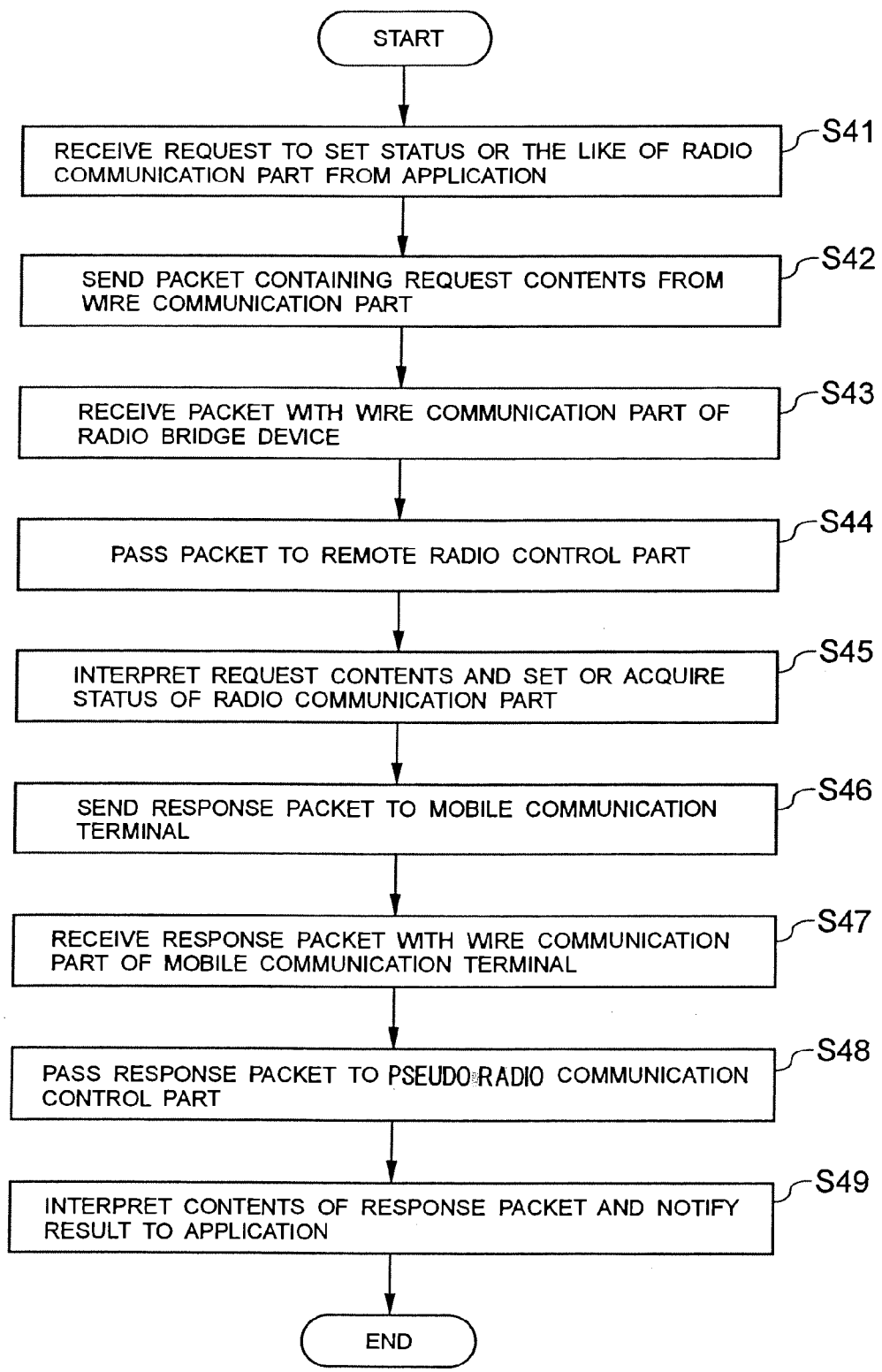
FIG. 8 is a flowchart showing an example of control of a radio communication part.

Next, the control of the radio communication parts is described. FIG. 8 is a flowchart showing one example of control of a radio communication part.

Referring to FIG. 8, when the pseudo radio communication control part 42 in the mobile communication terminal 2 receives a request from an application to set or acquire the status of the radio communication part 31 in the radio bridge device 3 (step S41), a packet (request packet) containing the request contents is sent to the radio bridge device 3 from the wire communication part 23 (step S42).

The request packet is received by the wire communication part 33 of the radio bridge device 3 (step S43), and passed to the remote radio control part 53 via the wire communication control part 54 (step S44).

The remote radio control part 53 interprets the request contents in the request packet, and after setting or acquiring the status of the radio communication part 31 in accordance with the request (step S45), the remote radio control part 53 sends a packet (response packet) including the result to the mobile communication terminal 2 from the wire communication part 33 using the wire communication control part 54 (step S46).

The response packet is received by the wire communication part 23 in the mobile communication terminal 2 (step S47) and passed to the pseudo radio communication control part 42 via the wire communication control part 44 (step S48).

The pseudo radio communication control part 42 interprets the contents of the response packet received from the remote radio control part 53 in the radio bridge device 3, and notifies the result with respect to the original request to the application (step S49).

According to the first embodiment, since all of the radio communication parts are not disposed on the mobile communication terminal when assembling a mobile communication terminal having a plurality of radio communication parts for carrying out handovers between radio base stations at a short time, and a radio communication part is disposed on a separate terminal having a bridge function, the degree of flexibility in the selection of parts is increased and it is possible to select a flexible system configuration that is tailored to the requirements specification.

Further, a pseudo radio communication control part is used when disposing a radio communication part on another terminal. The pseudo radio communication control part enables the radio communication part in the other terminal to be controlled in the same manner as the radio communication part in a mobile communication terminal itself. It is thus possible to utilize the conventional handover control software without modification, preserving the maintainability and extensibility of the terminal.

Embodiment 2

Figure 9:
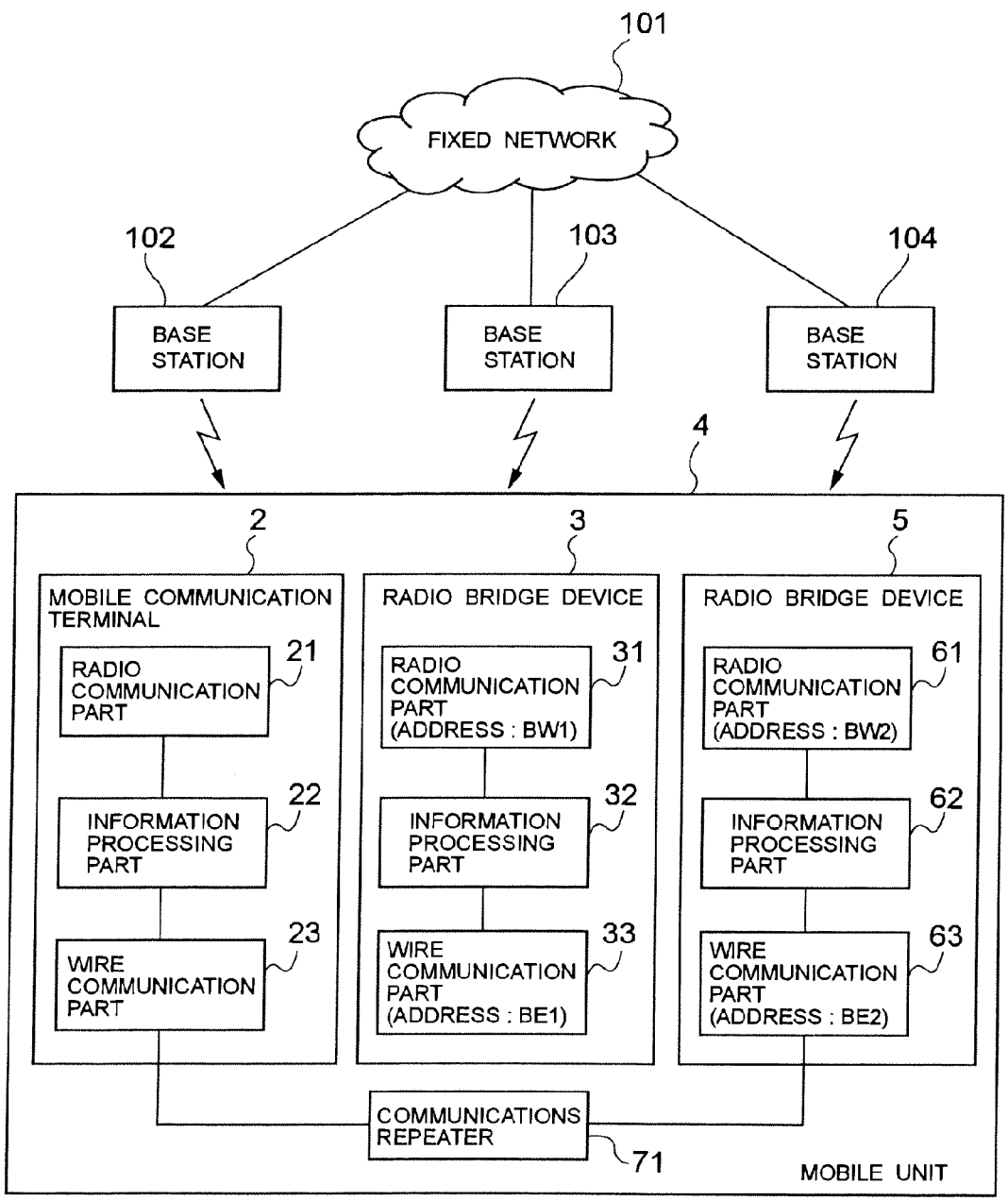
FIG. 9 is a schematic diagram of a second embodiment of the radio communication system of the present invention.

FIG. 9 is a schematic diagram of the second embodiment of the radio communication system of this invention. In FIG. 9, components that are the same as those in FIG. 1 are denoted by the same number as in FIG. 1, and a description of these components is omitted below.

The differences between this embodiment and the first embodiment are that two radio bridge devices (radio bridge devices 3 and 5) are provided in a mobile unit 4, and wire communication parts 23, 33 and 63 in the mobile communication terminal 2 and the radio bridge devices 3 and 4 are connected through a communications repeater 71. The remaining configuration is the same as the first embodiment. The internal configuration and operation of the radio bridge devices in this embodiment are the same as in the first embodiment.

Figure 10:
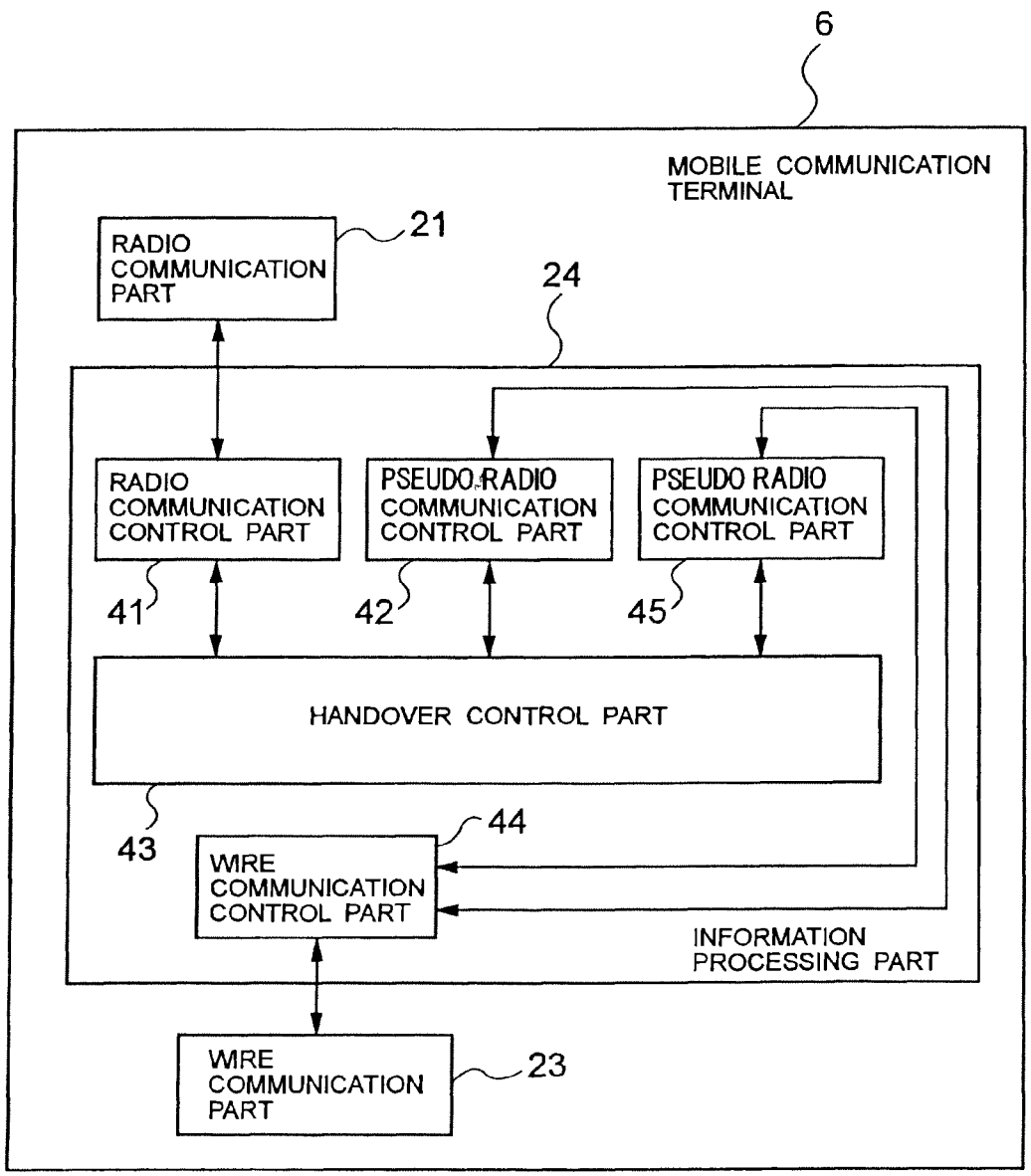
FIG. 10 is a schematic diagram of a second embodiment of the mobile communication terminal.

FIG. 10 is a schematic diagram of the second embodiment of the mobile communication terminal. In FIG. 10, components that are the same as those in FIG. 2 are denoted by the same number as in FIG. 2, and a description of these components is omitted below. The difference between this embodiment and the first embodiment is that two pseudo radio communication control parts (pseudo radio communication control parts 42 and 45) are provided in the information processing part 24. The remaining configuration is the same as the first embodiment.

Since two radio bridge devices are connected in this embodiment, the pseudo radio communication control parts 42 and 45 are provided to correspond with the radio bridge devices 3 and 5, respectively.

In this embodiment, a maximum of three radio base stations, i.e. 102 to 104, can be connected to the mobile unit 4 at the same time. Therefore, when radio base stations are disposed relatively close to each other, it is possible to achieve better communication quality than in the first embodiment by conducting handovers between radio base stations with good connection states.

Next, operations to send and receive packets in the second embodiment will be described. Hereinafter, an L2 address that is used by the radio communication part 31 in the radio bridge device 3 is denoted by "BW1", and an L2 address that is used by the wire communication part 33 in the radio bridge device 3 is denoted by "BE1". Likewise, an L2 address that is used by the radio communication part 61 in the radio bridge device 5 is denoted by "BW2", and an L2 address that is used by the wire communication part 63 in the radio bridge device 5 is denoted by "BE2". Further, it is taken that the pseudo radio communication control part 42 is associated with the radio bridge device 3, and the pseudo radio communication control part 45 is associated with the radio bridge device 5.

The packet transfer part 52 (refer to FIG. 3) of each of the radio bridge devices 3 and 5 carries out reception of packets that arrived at the radio communication parts 31 and 61 and the wire communication parts 33 and 63 through the radio communication control part 51 and the wire communication control part 54.

When the packet transfer part 52 in the radio bridge device 3 receives packets from the wire communication part 33 (step S1 in FIG. 4), and when the source L2 address of the received data is BW1 and the destination L2 address is not BE1 (Y in step S2), the packet transfer part 52 sends that data as it is, without changing the source and the destination L2 address, from the radio communication part 31 through the radio communication control part 51 (step S3).

On the contrary, when the source L2 address of the received data is not BW1 or the destination L2 address is BE1 (N in step S2), the packet transfer part 52 processes the packets internally (step S4).

When the packet transfer part 52 in the radio bridge device 3 receives packets from the radio communication part 31 (step S11 in FIG. 5), the packet transfer part 52 sends the received data as it is from the wire communication part 33 through the wire communication control part 54 (step S12).

When the packet transfer part 52 in the radio bridge device 5 receives packets from the wire communication part 63 (step S1 in FIG. 4), and when the source L2 address of the received data is BW2 and the destination L2 address is not BE2 (Y in step S2) the packet transfer part 52 sends that data as it is, without changing the source and the destination L2 address, from the radio communication part 61 through the radio communication control part 51 (step S3).

On the contrary, when the source L2 address of the received data is not BW2 or the destination L2 address is BE2 (N in step S2), the packet transfer part 52 processes the packets internally (step S4).

When the packet transfer part 52 in the radio bridge device 5 receives packets from the radio communication part 61 (step S11 in FIG. 5), the packet transfer part 52 sends the received data as it is from the wire communication part 63 through the wire communication control part 54 (step S12).

When a request to send packets is received from an application (step S21 in FIG. 6), the pseudo radio communication parts 42 and 45 send the packets from the wire communication parts 33 and 63 (step S22). At this time, the destination L2 address of the packets is the address specified by the application and the source L2 address of the packets is set as BW1 when the packets are sent from the radio bridge device 3 and set as BW2 when sent from the radio bridge device 5. The packets are received by the wire communication parts 33 and 63 in the radio bridge devices 3 and 5, respectively (step S23), and sent from the radio communication parts 31 and 61 by the packet transfer parts 52 (step S24).

When a request to receive packets is received from an application (step S31 in FIG. 7), the pseudo radio communication control parts 42 and 45 conduct reception of packets with the destinations BW1 and BW2, respectively, from the wire communication part 23 using the wire communication control part 44 (step S32), and pass the received packets to the application (step S33).

Next, the control of the radio communication parts is described. When the pseudo radio communication control part 42 in the mobile communication terminal 6 receives a request from an application to set or acquire the status of the radio communication part 31 in the radio bridge device 3 (step S41 in FIG. 8), a packet (request packet) containing the request contents is sent to the radio bridge device 3 from the wire communication part 23 (step S42).

The request packet is received by the wire communication part 33 in the radio bridge device 3 (step S43), and passed to the remote radio control part 53 via the wire communication control part 54 (step S44).

The remote radio control part 53 interprets the request contents in the request packet, and after setting or acquiring the state of the radio communication part 31 in accordance with the request (step S45), the remote radio control part 53 sends a packet (response packet) including the result to the mobile communication terminal 6 from the wire communication part 33 using the wire communication control part 54 (step S46).

The response packet is received by the wire communication part 23 in the mobile communication terminal 6 (step S47), and passed to the pseudo radio communication control part 42 via the wire communication control part 44 (step S48).

The pseudo radio communication control part 42 interprets the contents of the response packet received from the remote radio control part 53 in the radio bridge device 3, and notifies the result with respect to the original request to the application (step S49).

When the pseudo radio communication control part 45 in the mobile communication terminal 6 receives a request from an application to set or acquire the status of the radio communication part 61 in the radio bridge device 5 (step S41), it sends a packet (request packet) containing the request contents to the radio bridge device 5 from the wire communication part 23 (step S42).

The request packet is received by the wire communication part 63 in the radio bridge device 5 (step S43), and passed to the remote radio control part 53 via the wire communication control part 54 (step S44).

The remote radio control part 53 interprets the request contents in the request packet, and after setting or acquiring the state of the radio communication part 61 in accordance with the request (step S45), it sends a packet (response packet) including the result to the mobile communication terminal 6 from the wire communication part 63 using the wire communication control part 54 (step S46).

The response packet is received by the wire communication part 23 in the mobile communication terminal 6 (step S47), and passed to the pseudo radio communication control part 45 via the wire communication control part 44 (step S48).

The pseudo radio communication control part 45 interprets the contents of the response packet received from the remote radio control part 53 in the radio bridge device 5, and notifies the result with respect to the original request to the application (step S49).

Embodiment 3

Figure 11:
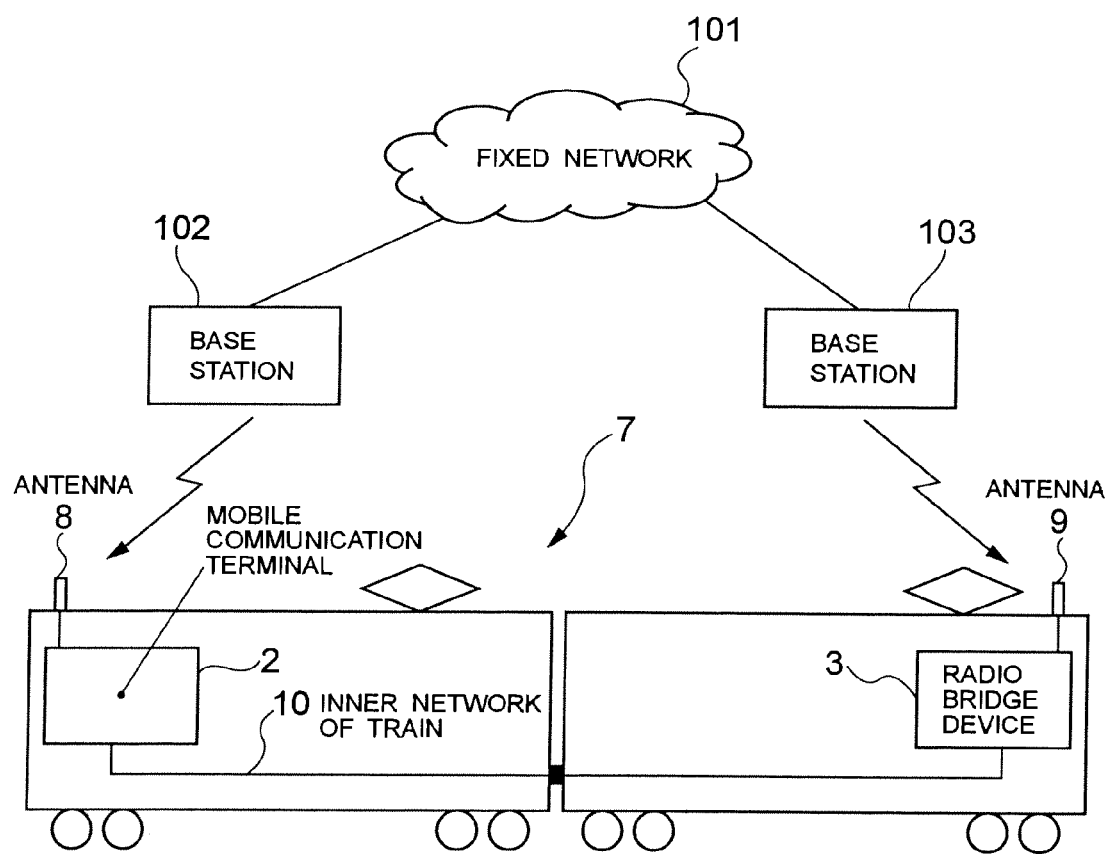
FIG. 11 is a schematic diagram of a third embodiment of the radio communication system of the present invention.

FIG. 11 is a schematic diagram of the third embodiment of the radio communication system of this invention. In FIG. 11, components that are the same as those in FIG. 1 are denoted by the same number as in FIG. 1, and a description of these components is omitted below.

Referring to FIG. 11, the third embodiment illustrates a case in which, when a mobile unit is a train 7, the mobile communication terminal 2 and the radio bridge device 3 are disposed at the front and the rear of the train 7, respectively.

In this embodiment, the operation and internal configuration of the mobile communication terminal 2 and the radio bridge device 3 are the same as in the first embodiment. Radio communication parts in the mobile communication terminal 2 and the radio bridge device 3 are respectively connected to antennas 8 and 9 that are disposed on the outside of the train carriages. Further, the wire communication parts in the mobile communication terminal 2 and the radio bridge device 3 are connected by an inner network 10 of the train, enabling communication between the two wire communication parts.

In this embodiment, since the two radio communication parts 21 and 31 are disposed at locations that are far from each other, it is easier to connect them to the separate radio base stations 102 and 103, respectively. Although a case is described for this embodiment in which one radio bridge device is provided, this invention is not limited thereto and the invention can also be applied to a case in which a plurality of radio bridge devices are provided.

The above embodiments described cases in which one or two radio bridge devices were provided, however, three or more radio bridge devices can also be provided. A configuration can also be employed in which all the radio communication parts are disposed in radio bridge devices and no radio communication parts are disposed in the mobile communication terminal. It is also possible to use a radio communication method instead of a wire communication method for communication between the mobile communication terminal and a radio bridge device. Further, although a case was described in Embodiment 3 in which a mobile unit is a train, this invention is not limited thereto, and this invention can also be applied to a case in which a mobile unit is another means of transportation such as an airplane or an automobile.

What is claimed is:

1. A radio communication system, comprising:
   a mobile communication terminal that includes a first radio communication part that communicates with a first base station, and
   a radio bridge device that includes a second radio communication part that communicates with a second base station,
   wherein the mobile communication terminal includes a first information processing part that carries out processing of information of the first radio communication part and the second radio communication part,
   wherein the first information processing part includes a radio communication control part that controls the first radio communication part, a pseudo radio communication control part that controls the second radio communication part, and a handover control part,
   wherein the handover control part controls a handover performed at the second radio communication part through the pseudo radio communication control part to search for the second base station and then connect to the second base station through the radio bridge device,
   wherein the mobile communication terminal on which the first radio communication part is included and the radio bridge device on which the second radio communication part is included are separate and distinct devices.

2. The radio communication system according to claim 1, wherein the pseudo radio communication control part and the second radio communication part are connected through communication parts that are respectively provided in the mobile communication terminal and the radio bridge device.

3. The radio communication system according to claim 2, which includes a second information processing part between the second radio communication part in the radio bridge device and the communication part in the radio bridge device, wherein the second information processing part includes a packet transfer part that conducts transfer of packets through the second radio communication part, and a remote radio control part that performs status setting and status acquisition of the second radio communication part.

4. The radio communication system according to claim 1, wherein a plurality of radio bridge devices are provided.

5. The radio communication system according to claim 1, wherein the transportation device corresponds to a train, airplane or automobile.

6. The radio communication system according to claim 5, wherein the mobile communication terminal is provided at a first location and the radio bridge device is provided at a second location different from the first location in the train, airplane or automobile.

7. The radio communication system according to claim 1, wherein, when packets are received by the second radio communication part when the second radio communication part is currently being used to connect to a base station for connectivity between the mobile communication terminal and a fixed network, the packets are forwarded by a packet transfer part of the radio bridge device to the pseudo radio communication control part, and wherein the pseudo radio communication control part provides the packets to an application currently in use, and wherein, when packets are received by the first radio communication part when the first radio communication part is currently being used to connect to a base station for connectivity between the mobile communication terminal and the fixed network, the packets are sent directly from the first radio communication part to the application currently in use.

8. The radio communication system according to claim 1, wherein the pseudo radio communication control part provides a same interface to the handover control part as the radio communication control part when the handover control part performs handover control.

9. A communication method for a radio communication system, the system comprising a mobile communication terminal including a first radio communication part that communicates with a first base station, and a radio bridge device including a second radio communication part that communicates with a second base station, wherein the communication method includes a first information processing step that carries out processing of information of the first radio communication part and the second radio communication part in the mobile communication terminal, wherein the first information processing step is performed by a radio communication control part that controls the first radio communication part, and by a pseudo radio communication control part that controls the second radio communication part, wherein the first information processing step includes a handover control step that controls a handover performed at the second radio communication part through the pseudo radio communication control part to search for the second base station and then connect to the second base station through the radio bridge device, wherein the mobile communication terminal on which the first radio communication part is included and the radio bridge device on which the second radio communication part is included are separate and distinct devices.

10. The communication method according to claim 9, which includes a second information processing step that performs processing of information in the radio bridge device, wherein the second information processing step includes a packet transfer step that performs a packet transfer through the second radio communication part and a remote radio control step that carries out status setting and status acquisition of the second radio communication part.

11. The communication method according to claim 9, wherein a plurality of the radio bridge devices are provided.

12. The communication method according to claim 9, wherein the transportation device corresponds to a train, airplane or automobile.

13. The communication method according to claim 12, wherein the mobile communication terminal is provided at a first location and the radio bridge device is provided at a second location different from the first location in the train, airplane or automobile.

14. The communication method according to claim 9, further comprising:

when packets are received by the second radio communication part when the second radio communication part is currently being used to connect to a base station for connectivity between the mobile communication terminal and a fixed network, forwarding the packets by a packet transfer part of the radio bridge device to the pseudo radio communication control part, and providing, by the pseudo radio communication control part, the packets to an application currently in use, and when packets are received by the first radio communication part when the first radio communication part is currently being used to connect to a base station for connectivity between the mobile communication terminal and the fixed network, sending the packets directly from the first radio communication part to the application currently in use.

15. The communication method according to claim 9, wherein a pseudo radio communication control part that controls the second radio communication part provides a same interface during the handover communication step as a radio communication control part that controls the first radio communication part.

\* \* \* \* \*